US012618201B2

(12) United States Patent
Thelin et al.

(10) Patent No.: US 12,618,201 B2
(45) Date of Patent: May 5, 2026

(54) MODULAR MAT SYSTEM

(71) Applicant: Spartan Mat LLC, Gilbert, AZ (US)

(72) Inventors: Justin Thelin, Gilbert, AZ (US); Aaron Allen, Gilbert, AZ (US); Brian Schenk, Gilbert, AZ (US)

( * ) Notice: Subject to any disclaimer, the term of this patent is extended or adjusted under 35 U.S.C. 154(b) by 927 days.

(21) Appl. No.: 17/761,511

(22) PCT Filed: Oct. 24, 2020

(86) PCT No.: PCT/US2020/057250
§ 371 (c)(1),
(2) Date: Mar. 17, 2022

(87) PCT Pub. No.: WO2021/081467
PCT Pub. Date: Apr. 29, 2021

(65) Prior Publication Data
US 2022/0372712 A1     Nov. 24, 2022

(51) Int. Cl.
*E01C 9/08* (2006.01)
*B32B 3/30* (2006.01)

(52) U.S. Cl.
CPC ............... *E01C 9/086* (2013.01); *B32B 3/30* (2013.01)

(58) Field of Classification Search
CPC .. E01C 5/00; E01C 5/20; E01C 19/086; E04F 15/02183; B23B 3/30
USPC ..................................................... 404/35, 36
See application file for complete search history.

(56) References Cited

U.S. PATENT DOCUMENTS

| | | | | |
|---|---|---|---|---|
| 5,653,551 A * | 8/1997 | Seaux | ...................... | E01C 5/18 |
| | | | | 404/35 |
| 6,511,257 B1 * | 1/2003 | Seaux | ..................... | E01C 9/086 |
| 6,649,110 B1 * | 11/2003 | Seaux | ............... | B29D 99/0089 |
| | | | | 249/176 |
| 6,695,527 B2 * | 2/2004 | Seaux | ..................... | E01C 9/086 |
| D667,144 S * | 9/2012 | Else | ......................... | E01C 5/005 |
| | | | | D25/163 |
| 8,464,490 B2 * | 6/2013 | Rapaz | ...................... | E01C 5/20 |
| | | | | 52/592.1 |
| 8,784,001 B1 * | 7/2014 | Phillips | ............... | E21B 41/0021 |
| | | | | 404/46 |
| 8,936,374 B1 * | 1/2015 | Royse | .................... | E01C 9/086 |
| | | | | 404/35 |
| 9,010,060 B2 * | 4/2015 | Rapaz | .................... | E01C 5/223 |
| | | | | 52/592.1 |
| 9,337,586 B2 * | 5/2016 | McDowell | ............. | H01R 43/26 |
| 9,506,255 B1 * | 11/2016 | Jones | ..................... | E01C 9/086 |
| 9,540,811 B2 * | 1/2017 | Rapaz | .................... | E01C 5/001 |
| D832,468 S * | 10/2018 | Jones | .......................... | D25/163 |
| 10,722,991 B2 * | 7/2020 | Gmitro | .................... | B23P 15/12 |
| 10,895,044 B2 * | 1/2021 | Penland, Jr. | .......... | E01C 11/222 |
| D928,993 S * | 8/2021 | Jones | .......................... | D25/163 |

(Continued)

*Primary Examiner* — Gary S Hartmann

(74) *Attorney, Agent, or Firm* — Accelerate IP LLC

(57) ABSTRACT

A module mat system with first layer that is joined to a second layer by fusion welding, hot welding, hand welding, seam welding, heat pressing, or other methods know to those having skill in the art. Each layer has a central core with a first cellular structure formed from ribs extending from the interior surface. The cross section of the ribs in the central core of the first layer matches the cross section of the ribs in the central core of the second layer such that when fusion welded together the ribs of the central core of the first layer weld to the ribs of the central core of the second layer.

13 Claims, 14 Drawing Sheets

(56)                    References Cited

U.S. PATENT DOCUMENTS

| | | | | |
|---|---|---|---|---|
| 11,712,869 | B2 * | 8/2023 | Manuel | B29C 43/10 |
| | | | | 264/239 |
| 12,129,608 | B2 * | 10/2024 | Aziz | E01C 9/086 |
| 2008/0199650 | A1 * | 8/2008 | Yaw | B32B 3/02 |
| | | | | 428/88 |
| 2021/0108422 | A1 * | 4/2021 | Penland, Jr. | E04F 15/02177 |
| 2022/0136181 | A1 * | 5/2022 | Bordelon | E01C 9/086 |
| | | | | 404/35 |
| 2025/0012018 | A1 * | 1/2025 | Aziz | E01C 11/16 |

* cited by examiner

MODULAR MAT SYSTEM

CROSS REFERENCE TO RELATED APPLICATIONS

The present application claims the benefit under 35 U.S.C. 119 of U.S. Provisional Patent Application Ser. No. 62/926,132 filed Oct. 25, 2019. The U.S. Provisional Patent Application Ser. No. 62/926,132 is hereby incorporated by reference in its entirety.

TECHNICAL FIELD

The present specification relates to a modular mat system, more particularly a modular mat system with uniform construction with an enforced flange which provides increased strength, protection and durability for heavy industrial environments.

BACKGROUND

Heavy duty modular mat systems have been designed and utilized to provide temporary and rigid driving surfaces in remote and inaccessible areas. Such modular mat systems are primarily used where the natural environment provides unstable and soft surfaces for heavy construction equipment to drive across and operate. Heavy duty modular mat systems may be utilized to provide driveways, parking areas, walkways, platforms, or others rigid surfaces for vehicles, or other equipment. The modular mats can be adapted to the particular topographic or geographic needs of the particular work site.

In operation, the choice of a mat system is primarily based upon the amount of load expected to be exerted on the mat, and the condition of the environment that the mat will be placed on which can be rock, dirt, concrete, grass, mud, water, mud, rock, or other such underlying substrates. Heavier construction equipment requires that the mats be resistant to cracking and breaking while under load, which can result in mats that are heavy and more cumbersome for the user. Since most construction sites are in undeveloped or remote areas, installation and removal of the mats are very expensive and time consuming. Because of the high costs associated with installation and removal of a modular mat the process must be done quickly and efficiently.

Traditional mats generally use modular mat tiles that are linked together by a plurality of connectors which can be some mechanical mechanism. The mechanical mechanisms can be bolts or multiple piece cams that lock the mats together. Complex interactions between the mats causes stress between the mats and the connection points. In addition, this type of method requires the use of a large number of mats with bolts or multiple piece cams that lock the mats together in a side-by-side fashion, which can be tedious and time consuming when dealing with large areas. These mats are connected at one or more flanges that extend beyond the main body of the mat. These flanges are either part of the top main body, bottom main body, or both wherein the flanges are usually a solid piece which can decrease the structural strength when attached to the opposing mat when bending or flexing while under load.

Current mats such as that provided in U.S. Pat. No. 9,506,255 provides for a modular mat having two layers wherein the layers have a central portion and flange that extends outwardly from the central portion. The two layers have at least one fitting receiver and a locking pin that connects the mats together. This type of mat design is limited in structural strength because it adds stress risers to the points within the central portion of the mat where the fitting receivers are located, and where the mats are connected together by a mechanical mechanism. These stress risers prohibited the mat to freely extend or flex when a heavy vehicle is driving across or stored on the mat. At the points where the stress risers are located these types of mats become brittle and crack under load and will eventually lose structural integrity. In addition, this mat design comprises apertures that extend through the first flange and the second flange wherein the apertures can have as much as quarter inch difference in size between the plurality of apertures causing for loose fitting receivers.

It would be advantageous to provide a modular mat system which maintains it structural integrity under high loads and is durable for heavy industrial applications. There is also a need for a modular mat system that can quickly be assembled and disassembled.

SUMMARY

A module mat system with first layer that is joined to a second layer by fusion welding, hot welding, hand welding, seam welding, heat pressing, or other methods know to those having skill in the art. Each layer has a central core with a first cellular structure formed from ribs extending from the interior surface. The cross section of the ribs in the central core of the first layer matches the cross section of the ribs in the central core of the second layer such that when fusion welded together the ribs of the central core of the first layer weld to the ribs of the central core of the second layer.

In one embodiment, the central core has a first band extending from at least one side of the central core, and the first band has a cellular structure with a cross-section that is substantially smaller than the cross section of the cellular structure of the central core. Alternatively, the first band has a first band has a first portion that is proximal to the central core and a second portion distal to the central core, and the second portion has a third cellular structure formed from ribs extending from the interior surface of the first band, wherein the third cellular structure has a cross section that is substantially smaller than the cross section of the cellular structure of the first portion. In particular embodiments, the first band includes at least one guide hole in the first portion of the first band.

The exterior surface of at least one layer comprises a plurality of traction elements raised from the exterior surface to allow the mat system to grip the surface on which it is laid or to allow vehicles to grip the mat system.

In addition to the first band, each layer may comprise a second band extending peripherally from a different side of the central core, where the second band is vertically offset from the first band. The second band has a fourth cellular structure formed from ribs extending from the interior surface of the second band that can have the same cross section as the cellular structure of the first band, but with a different rib height. In one embodiment, the second band connects to the central core at a peripheral wall, and the peripheral wall is taller than the cell ribs that contact the peripheral wall.

In one embodiment, the first layer and the second layer are fusion welded together, and particularly the cell ribs of the first layer are welded to the cell ribs of the second layer. The first band of the first layer may be fusion welded to the second band of the second layer.

Aspects disclosed herein comprise a method of manufacturing a traction mat system comprising providing a stand connected to a press by at least one support and moving a trolley that supports at least one mold having a raised pattern between the stand and beneath the press. Placing a mat material in the mold. Placing a grip layer composed of at least one of a foil sheets and an aggregate layer over the mat. Pressing the press to the mold forming the foil sheet or aggregate material onto the mat material. The traction mat system can further comprise a second mold attached to the press. Wherein the grip layer is placed over a surface of the mat and a second grip layer is placed over a second surface of the mat.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of" creating a modulate mat, without also reciting in such phrases any structure, material or act in support of the function. Thus, even when the claims recite a "means for performing the function of molding a modulate mat, step for performing the function of molding a modular mat," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

FIG. 3b is an isometric exploded view, with the first layer omitted, of a modular mat in accordance a different embodiment than that shown in FIG. 3a.

DETAILED DESCRIPTION

Figure 1:
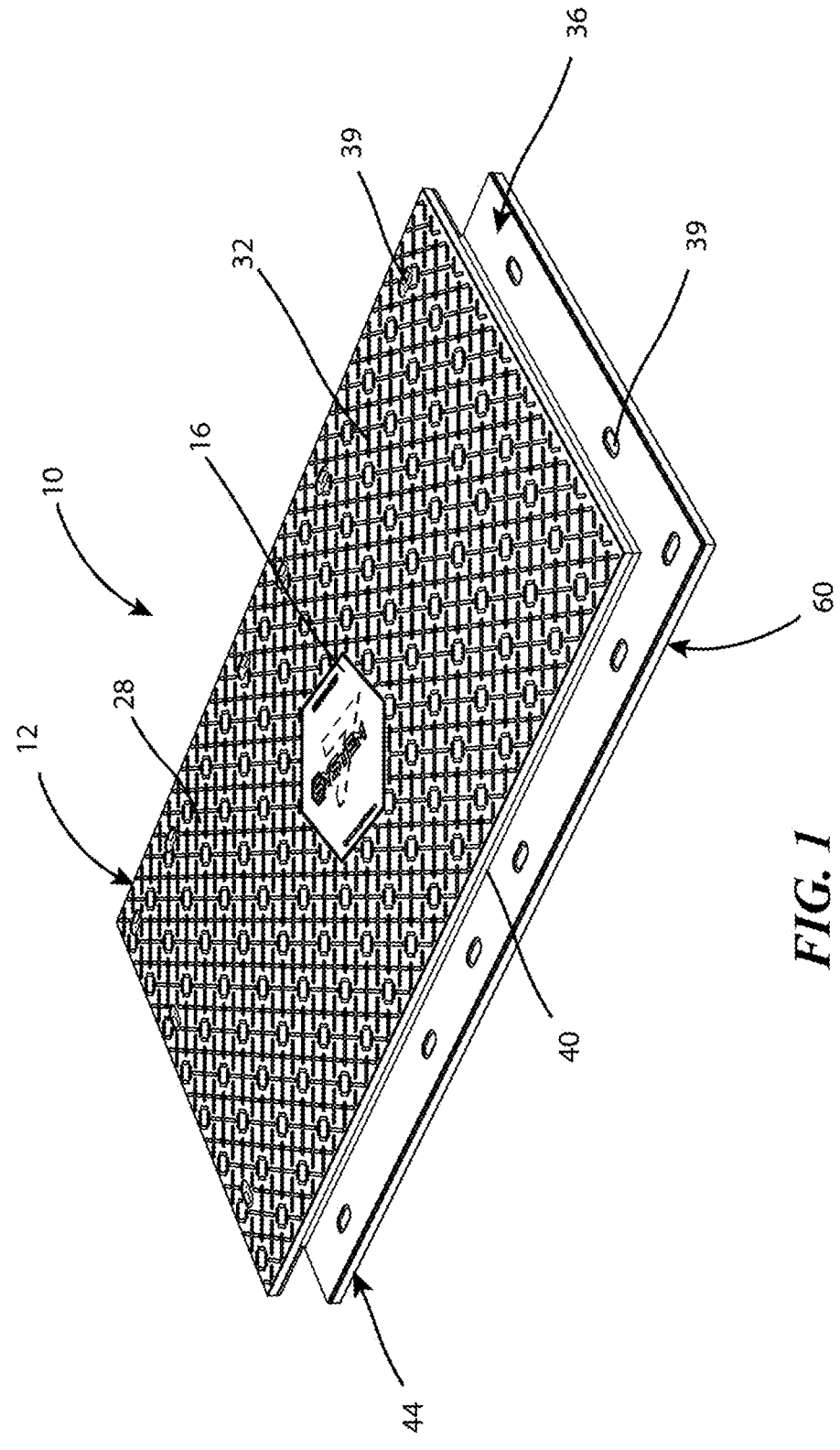
FIG. 1 is an isometric view of a modular mat in accordance to one, or more embodiments.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As shown in the accompanying figures, a modular mat system 100 can comprise a plurality of modular mat system 10. Referring initially to FIGS. 1-6, the modular mat system 10 can comprise at least two halves, a first layer 12 is joined to a second layer 60 form the modular mat system. The first layer 12 and the second layer 60 can produce a dual surface, having the same or varying surface patterns to support heavy weight, and industrial applications and vehicles wherein the vehicles can need some type of support to drive over such as, dirt, gravel, water, sand, mud, or the like. The first layer 12 and the second layer 60 can be joined or affixed together, as described further herein, and can produce no offset layers or portions. The modular mat system 10 can be any suitable dimension that creates a ground covering that can support high industrial vehicles such as, but not limited to, tractors, cranes, trucks, or the like. The modular mat 10 length can be for example between 10.5 feet to 15 feet, more preferably between 11 feet and 13.5 feet, and still more preferably a length of approximately 12.75 feet. The modular mat 10 width can be for example between 4 feet to 7.25 feet, more preferably between 5 feet and 7 feet, and still more preferably a length of approximately 6.5 feet. The modular mat system 10 thickness can be for example between 0.25 inches to 18 inches, more preferably between 3 feet and 14 inches, and still more preferably a length of approximately 4.35 inches but can be any suitable dimension that allows for heavy, industrial equipment to drive over the modular mt system 10.

The first layer 12 and second layer 60 can each have an exterior surface and an interior surface wherein an interior surface 18 can comprise a central core 16. The modular mat system 10 can be constructed of any suitable material that withstand high loads from industrial equipment such as, for example, high-density polyethylene (HDPE), polystyrene, polypropylene, acrylonitrile butadiene styrene, polyvinyl-chloride, or the like. In a preferred embodiment, the material is able to bend, flex, compress, and resist impacts without cracking or breaking. The material can also be resistant to a range of temperatures, UV resistant, and can be injected with other types of material during the manufacturing process for added strength. However, it should be understood that the modular mat system 10 can be constructed of any suitable material having the strength and durability requirements necessary for its intended purpose. The central core 16 can comprise the majority of the modular mat system 10 and provides the usable surface which heavy equipment may travel across. The central core 16 can be substantially planar, to allow for heavy loads to easily drive across, or rest upon. The central core 16 is substantially rectangular in shape, but can be for example, square, circular, hexagonal, or the like provided that the modular mat system can be easily over-lapped and locked together with adjacent modular mat systems 10.

The first layer 12 and second layer 60 can comprise an interior surface 18 and an exterior surface 28 wherein the interior surface can comprise a first cellular structure 20 formed from ribs 22 extending from the interior surface wherein the cells of the first cellular structure can have a first cross section. The ribs 22 can be integrally formed or disposed on the central core 16 wherein the ribs can create a series of intersecting reinforcing supports creating a plurality of spaces within the interior surface 18. The ribs 22 can be disposed on the interior surface 18 creating the first cellular structure 20 wherein the first cellular structure can be any suitable configuration, such as square, rectangular, honeycomb, triangular, honeycomb, or any combination thereof. The first cellular structure 20 can be fully integrated within the interior surface 18 of the central core 16, or in other embodiments the first cellular structure can be inte-grated on a portion of the central core wherein a portion of the central core can be a solid mat and the other portion can comprise a first cellular structure. The ribs 22 can be such as, for example, form-rib, plate-type ribs, truss ribs, closed ribs, forged ribs, milled ribs, or the like to add strength and support to the central core 16, interior surface 18 and the exterior surface 28. The interior surface 18 and the central core 16 can create a thickness wherein the thickness can be between 0.25 inches to 18 inches, more preferably between 3 feet and 14 inches, and still more preferably a length of approximately 4.35 inches but can be any suitable dimen-sion that allows for heavy, industrial equipment.

The exterior surface 28 can comprise a plurality of traction elements 32 disposed in a pattern which can increase the friction between the surface of the modular mat system 10 and the tires or tracks of a heavy industrial vehicle. The traction elements 32 generally extend out-wardly from the exterior surface 28. The traction elements 32 are can be substantially between and do not align with the ribs 22 or can be aligned with the ribs on the interior surface 18 wherein aligning the traction elements with the ribs can increase the strength and distribute the weight of the vehicle from the traction elements to the ribs. The traction elements 32 can be a plurality of different shapes such as, rectangular, circular, square, hexagonal, or the like and can be in varying patterns which repeat across the whole or partial across the exterior surface 28. The traction elements 32 can extend outwardly from the exterior surface 28 at a length of which can be for example, between 0.05 inches to 3 inches, more preferably between 0.1 feet and 1.5 inches, and still more preferably a length of approximately 0.125 inches. In other embodiments the traction elements 32 can be recessed into the exterior surface 28, or can be set outwardly at an angle, or any combination thereof. The first layer 12 and the second layer 60 can have the same or similar central core 16 and interior surface 18 wherein the first cellular structure 20 of the first layer 12 can mate with the first cellular structure of the second layer. The first layer 12 and the second layer's 60 exterior surface 28 can have the same traction elements 32 or can have varying traction elements on each of the outer surfaces.

A first band 44 can extend from at least one side of the central core 16, wherein the first band has a second cellular structure 46 formed from ribs 45 extending from the interior surface 18 of the first band, wherein the cells of the second cellular structure 46 can have a second cross section wherein the second cross section is substantially smaller than the first cross section. The first cellular structure 20 can be larger or smaller in height, thickness and cell density than the second cellular structure 46. The first band 44 has a first portion 48 that is proximal to the central core 16 and a second portion 50 that can be distal to the central core, wherein the second portion has a third cellular structure 52 formed from ribs 54 extending from the interior surface 18 of the first band, wherein the third cellular structure has a third cross section and the cross section of the third cellular structure is substantially smaller than the cross section of the second cellular structure 46. In certain embodiments the cross section of the third cellular structure 52 can be larger than the cross section of the second cellular structure 46 wherein the thickness, height and cell density can be larger or smaller than the second cellular structure.

In embodiment the first band 44 can include at least one guide hole 39 in the first band. A guide hole can be in the first portion 48 of the first band 44. The guide holes 39 can be recessed into the exterior surface of the flange and can generally be rectangular in shape with radius ends, however, it may be any suitable shape, including square, triangular, or hexagonal. The guide holes 39 can be equal distance apart or placed such that the guides are positioned at varying distances. The guide holes 39 can be holes or can be solid piece of material wherein the holes can be machined into the guide holes after the mat is formed by such as, for example an end mill, drill, router or the like. In certain embodiments, the guide holes 39 can be omitted from the flange.

The modular mat system 10 can further comprise at least one second band 36 wherein a second band can be attached to the central core 16, both the first layer 12 and the second layer 60 can have a second band, wherein the second band can extend peripherally from at least one side of the central core 16, wherein the second band is vertically offset from a first band 44. The second band 36 has a fourth cellular structure 37 formed from ribs 38 extending from the interior surface of the second band. The second band 36 can connect to the central core 16 at a peripheral wall 34, and wherein the peripheral wall can be taller than the cell ribs that contact the peripheral wall from the first cellular structure 20. In other embodiments, the peripheral wall 34 can be shorter than the cell ribs that contact the peripheral wall from the first cellular structure.

Figure 2A:
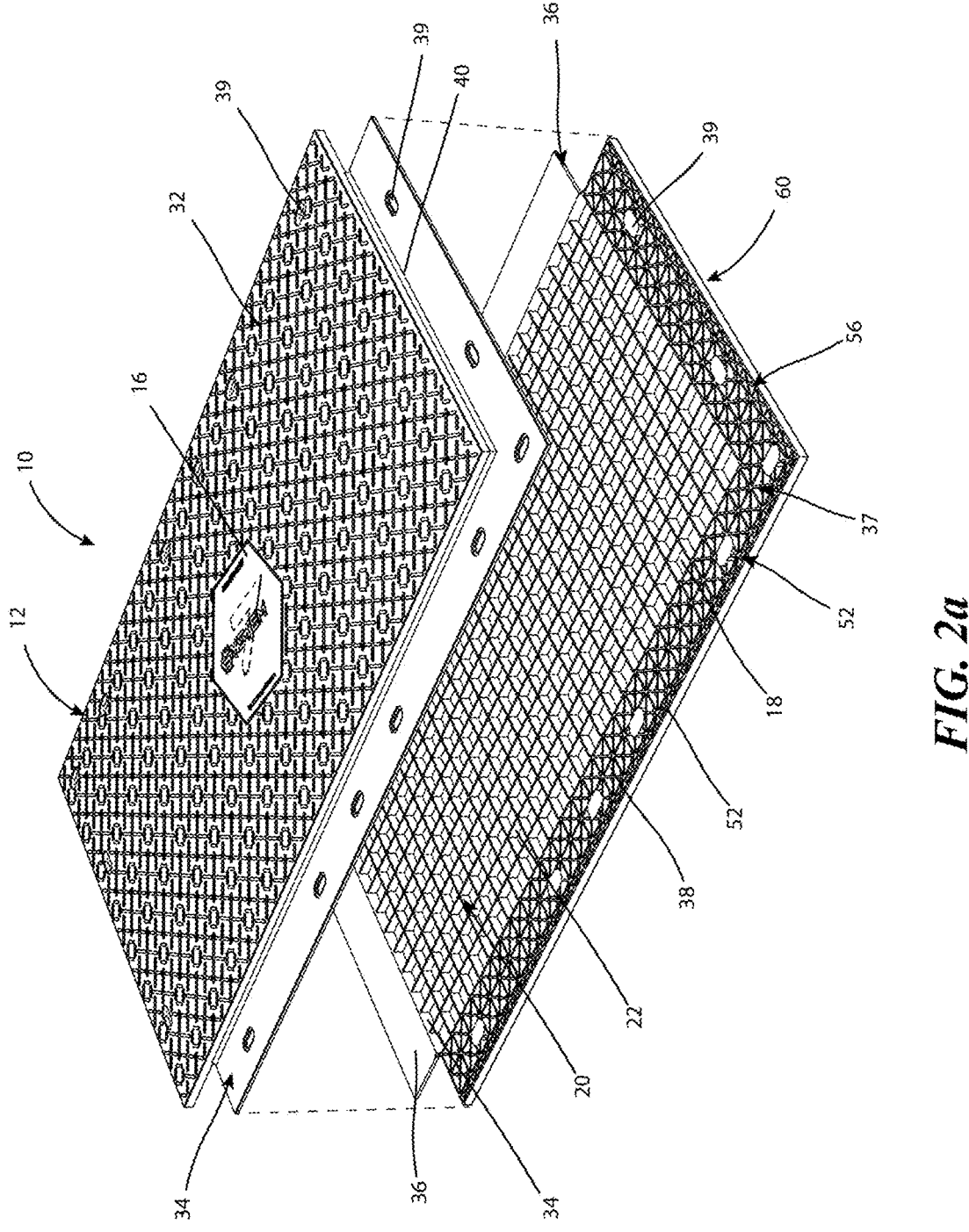
FIG. 2a is an exploded top isometric view of a modular mat in accordance to one, or more embodiments.
Figure 2B:
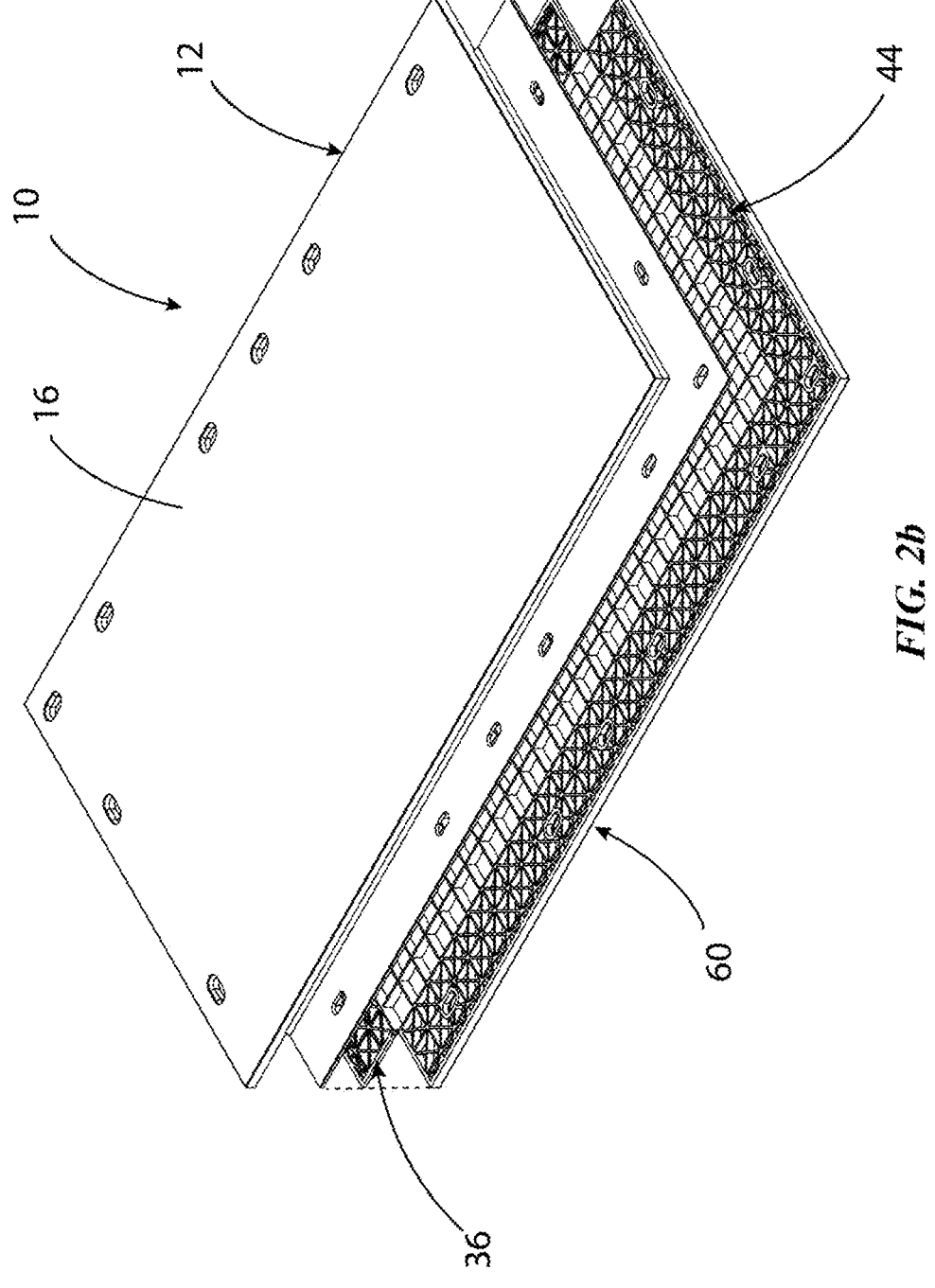
FIG. 2b is an exploded bottom isometric view of a modular mat in accordance to one, or more embodiments.
Figure 2C:
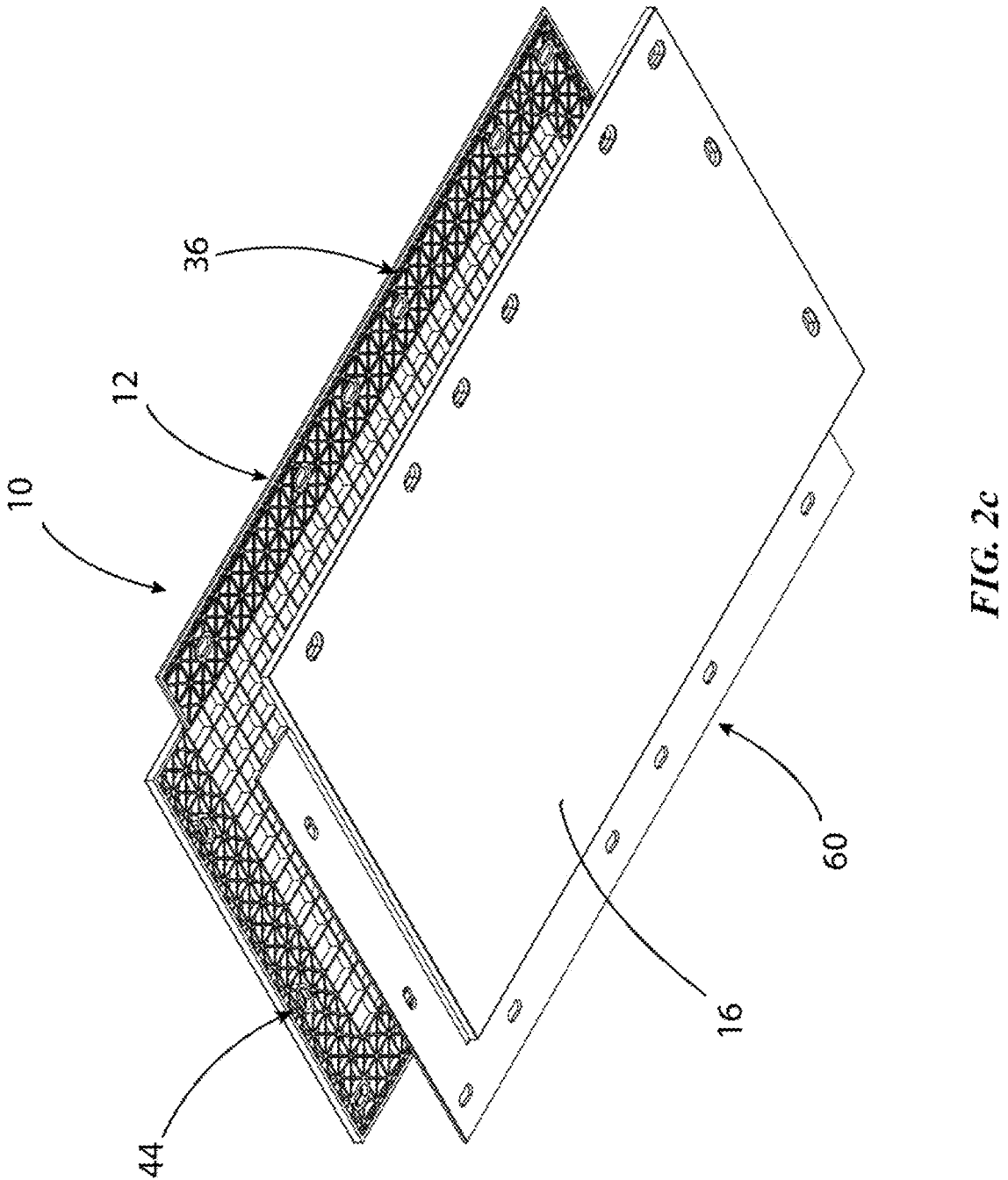
FIG. 2c is an exploded bottom isometric view of the preferred embodiment of a modular mat in accordance to one, or more embodiments.

The second band 36 can be offset vertically from the interior surface 18 and the central core 16 and can extend outwardly from the central core 16. The second band 36 can comprise one or more fourth cellular structures 37 which can connect to a secondary perimeter 58 having a thickness or in other embodiments the second band can be flat as shown in FIG. 2a. In other embodiments, the fourth cellular structure 37 can have a higher density rib 38 structure than the first cellular structure 20 or the second cellular structure 46. The cell ribs of the first band 44 and the second band 36 can have a height, and wherein the height of the cell ribs of the second band can be substantially lower than the height of the cell ribs of the first band. In other embodiments, the cell ribs of the first band can have a height that is substantially higher than the height of the cell ribs of the first band. The first layer 12 and the second layer 60 are fusion welded together wherein the cell ribs of the first layer are welded to the cell ribs of the second layer. The first band 44 of the first layer 12 is fusion welded to the second band 36 of the second layer 60.

The second band 36 has a first portion that is proximal to the central core and a second portion distal to the central core, wherein the second portion has a fifth cellular structure 56 formed from ribs extending from the interior surface of the second band, wherein cross section of the cellular structure of the second portion of the second band is substantially smaller than the cross section of the first portion of the second band. The fifth cellular structure 56 can have a substantially smaller density of cells than the fourth cellular structure 37 wherein the fifth cellular structure can have a solid portion on its outer most perimeter portion. In other embodiments the fifth cellular structure 56 can have a substantially larger density of cells than the fourth cellular structure 37.

In embodiments, the cross sections of the cellular structure of the first band 44 and the cellular structure of the second band 36 are the same and in other embodiment the cross-sectional area can vary in thickness, height, and density.

Figure 3A:
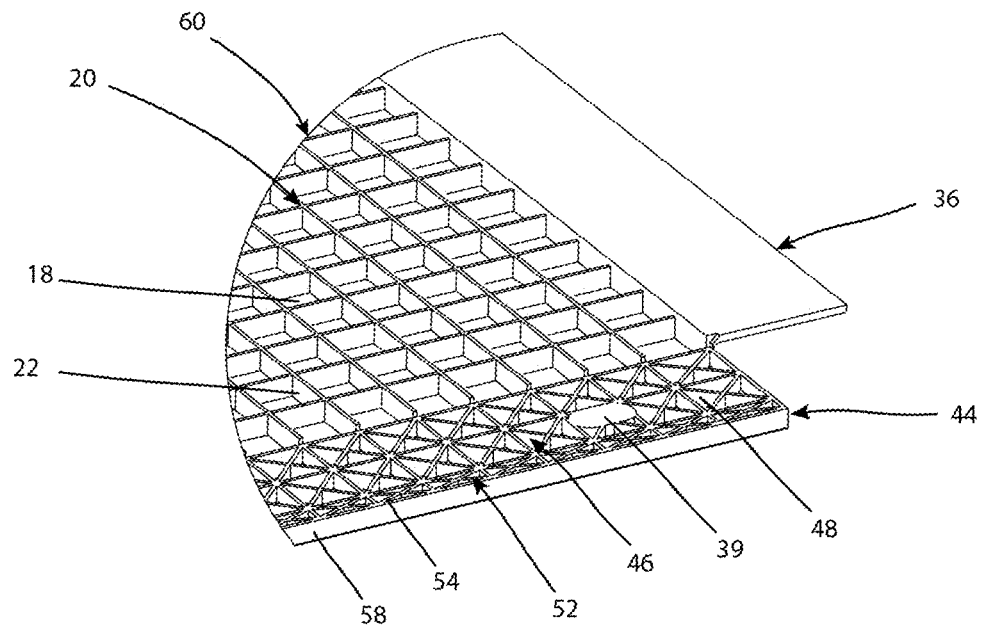
FIG. 3a is an isometric exploded view, with the first layer omitted, of a modular mat in accordance to one, or more embodiments.
Figure 3B:
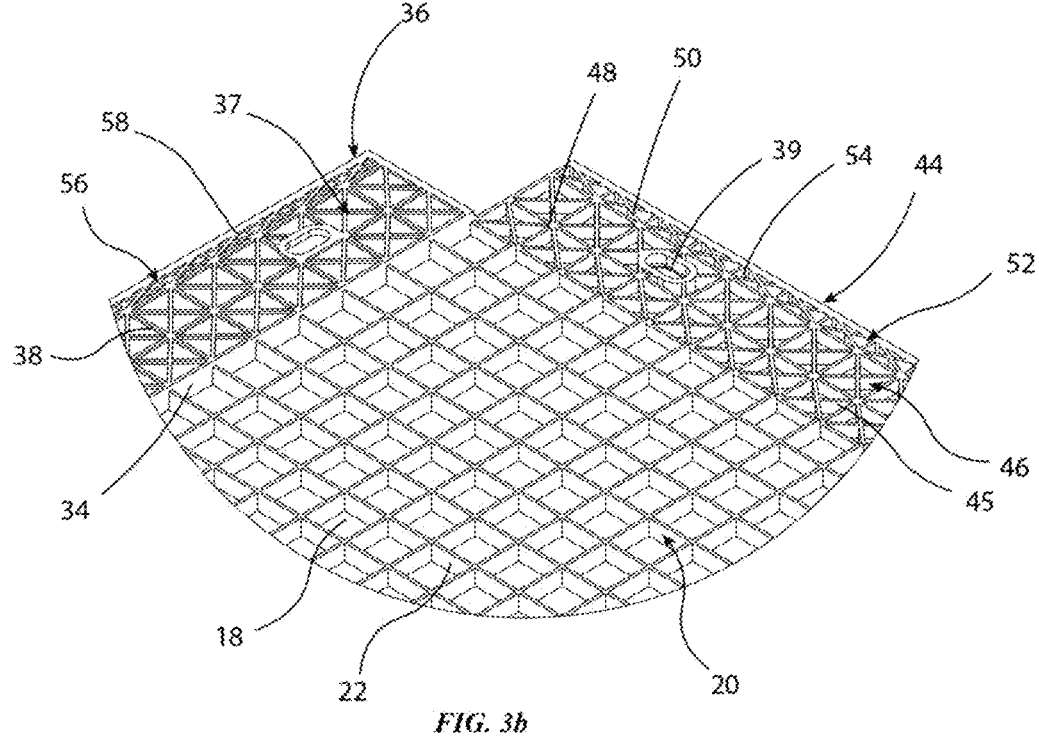
Figure 4:
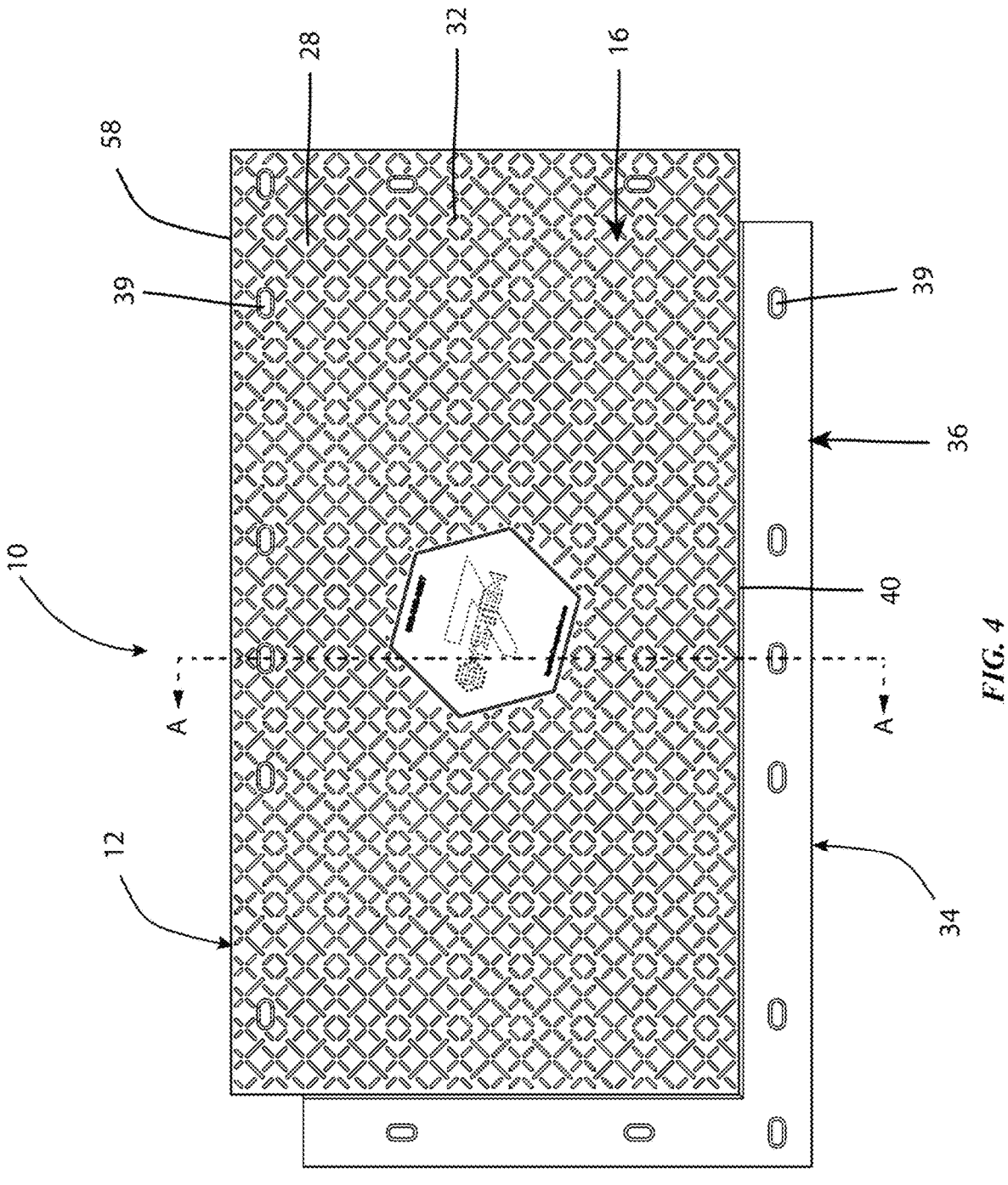
FIG. 4 is a top view of a modular mat in accordance to one, or more embodiments.
Figure 5A:
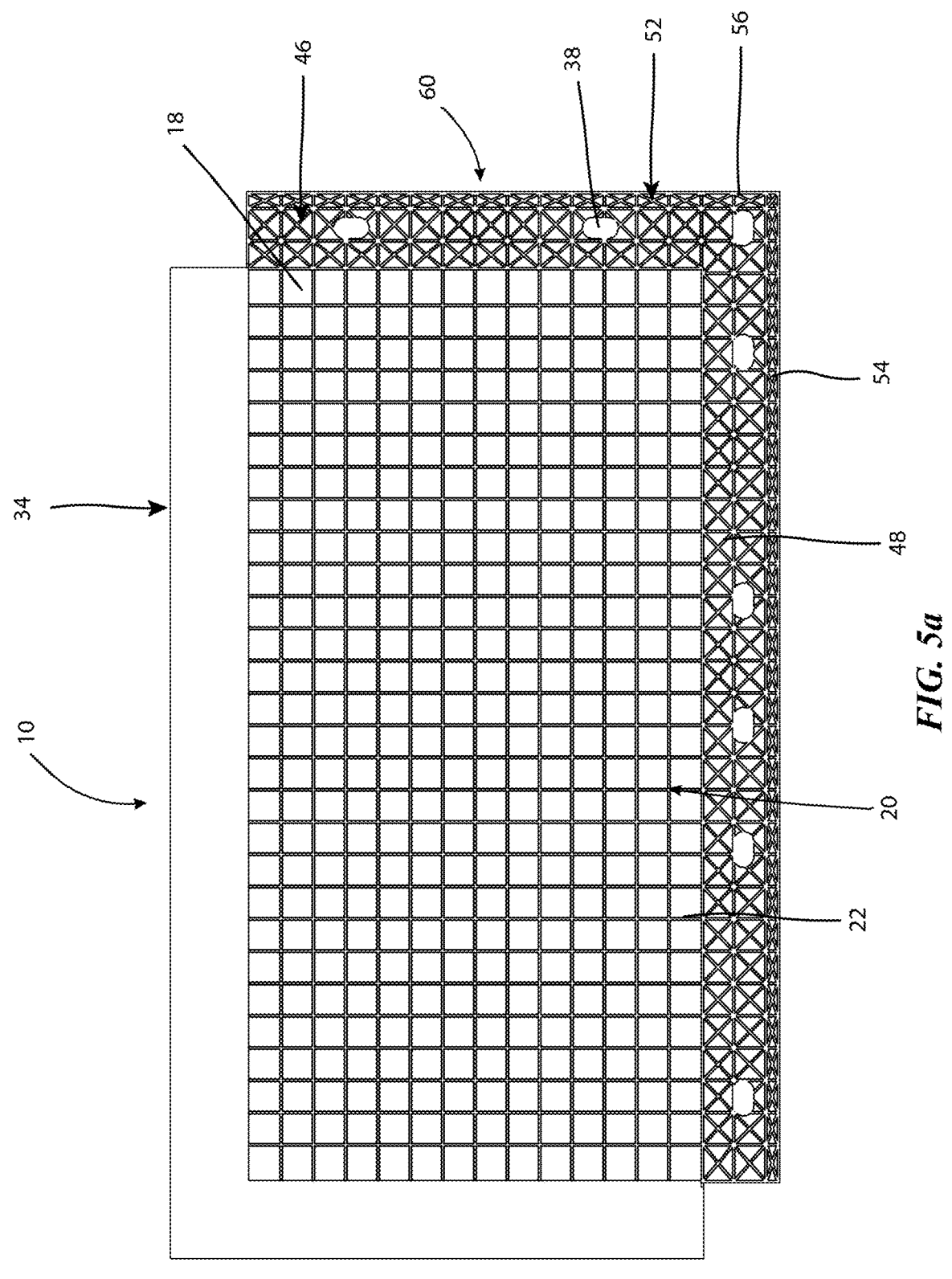
FIG. 5a is a top view of an interior surface, with the first layer being omitted, of a modular mat in accordance to one, or more embodiments.
Figure 5B:
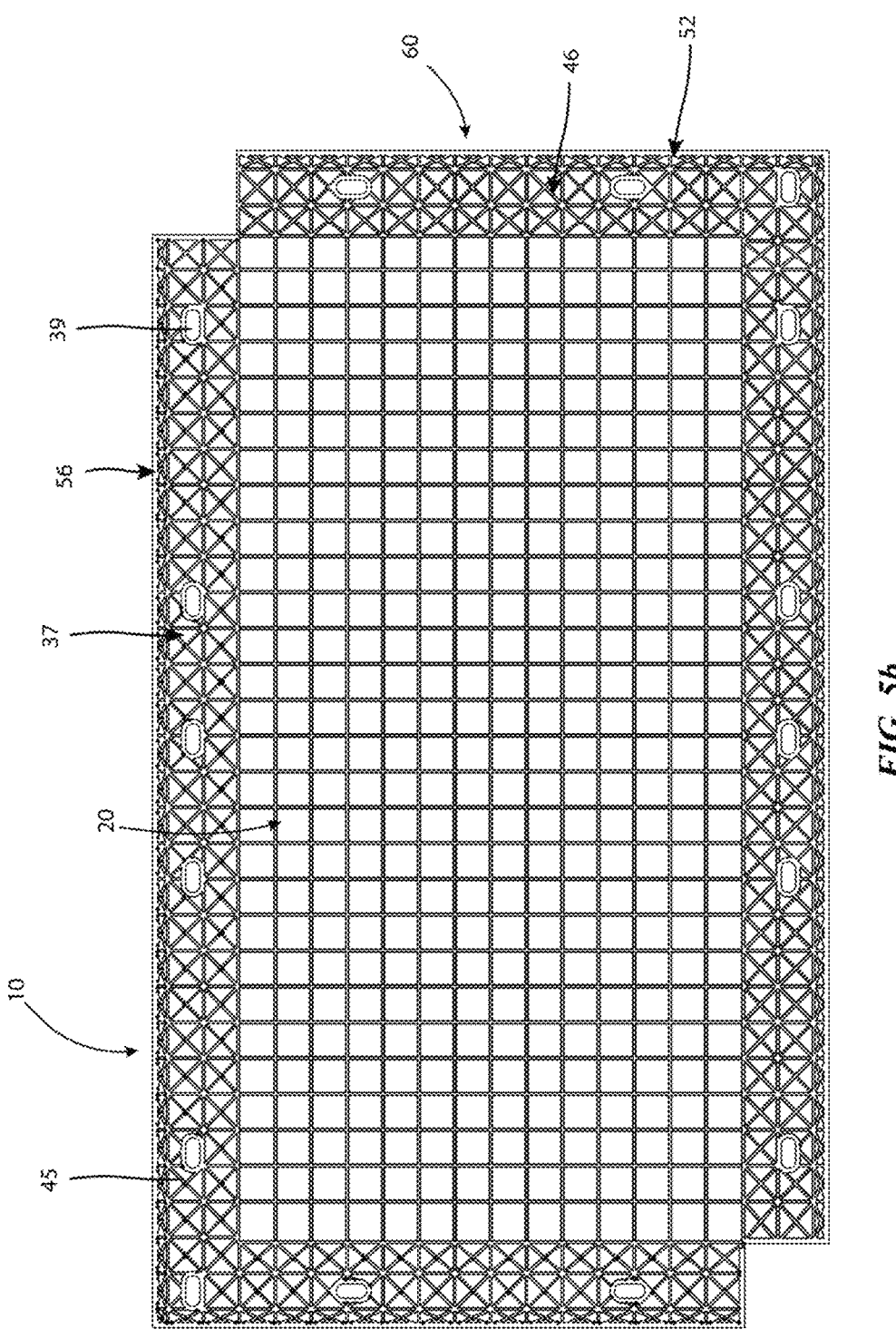
FIG. 5b is a top view of an interior surface, with the first layer being omitted, of a modular mat in accordance to one, or more embodiments.
Figure 6:
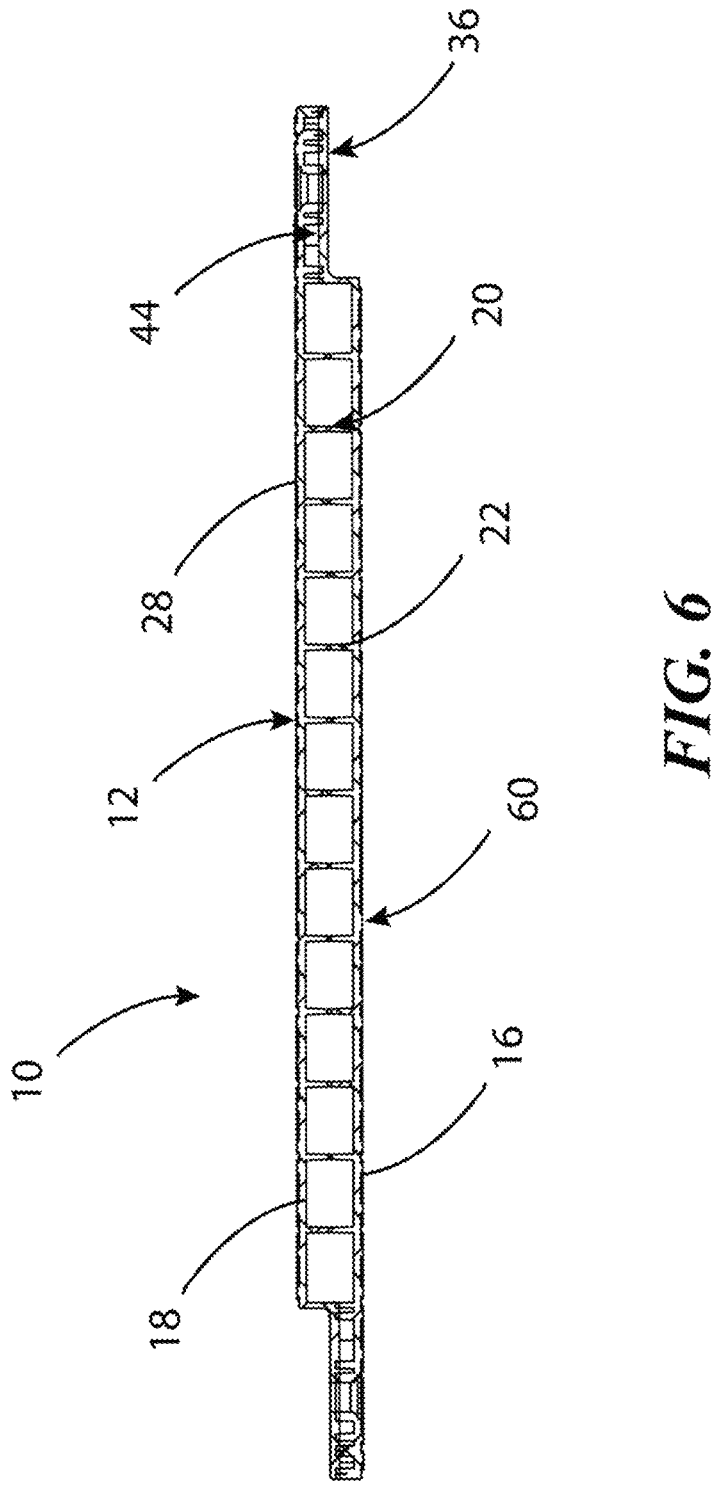
FIG. 6 is a cross-sectional view of FIG. 4 of a modular mat in accordance to one, or more embodiments.
Figure 7:
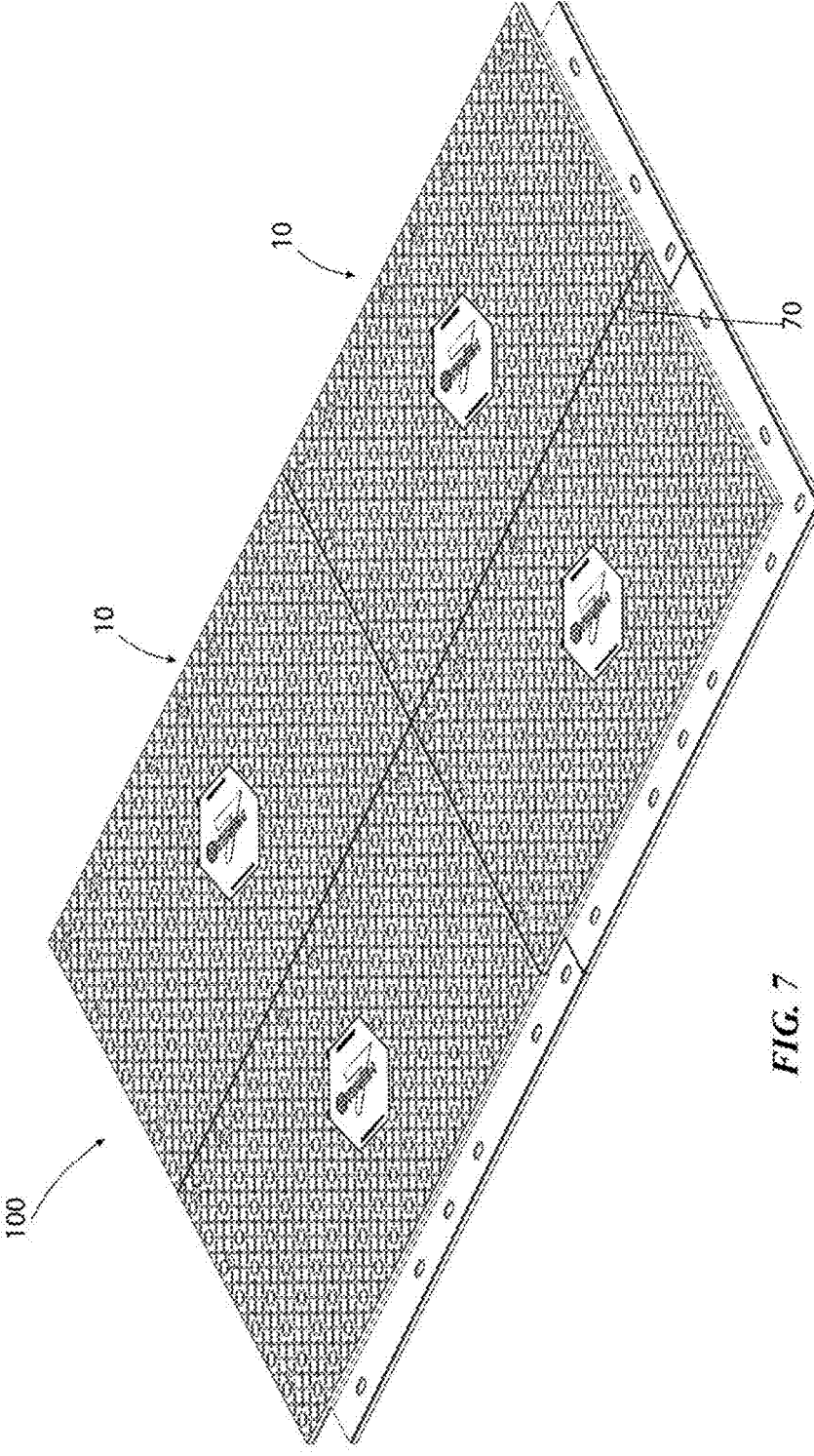
FIG. 7 is an isometric view of a modular mat system in accordance to one, or more embodiments.

The fourth cellular structure 37 and fifth cellular structure 56 can allow for the material to melt into the cells when the first layer 12 and second layer 60 are welded together as described herein creating a stronger more solid flange. The second band 36 can be integrally formed, or formed separately from, and then affixed to the central core 16. In the preferred embodiment the second band 36 is integrally formed as a part of the central core 16. The first band 44, second band 36 and the central core 16 can be formed from the same material, such as, high-density polyethylene (HDPE), polystyrene, polypropylene, acrylonitrile butadiene styrene, polyvinylchloride, or the like. The first band 44 and the second band 36 can be disposed along at least one edge of the central core 16 wherein the second band can be offset vertically from the central core by for example, between 0.125 and 4 inches, more preferably between 0.2 inches and 2 inches and still more preferably a vertical offset of at least 1 inch as shown in FIG. 3. The first band 44 can have the same exterior surface 28 as the central core 16.

Figure 8A:
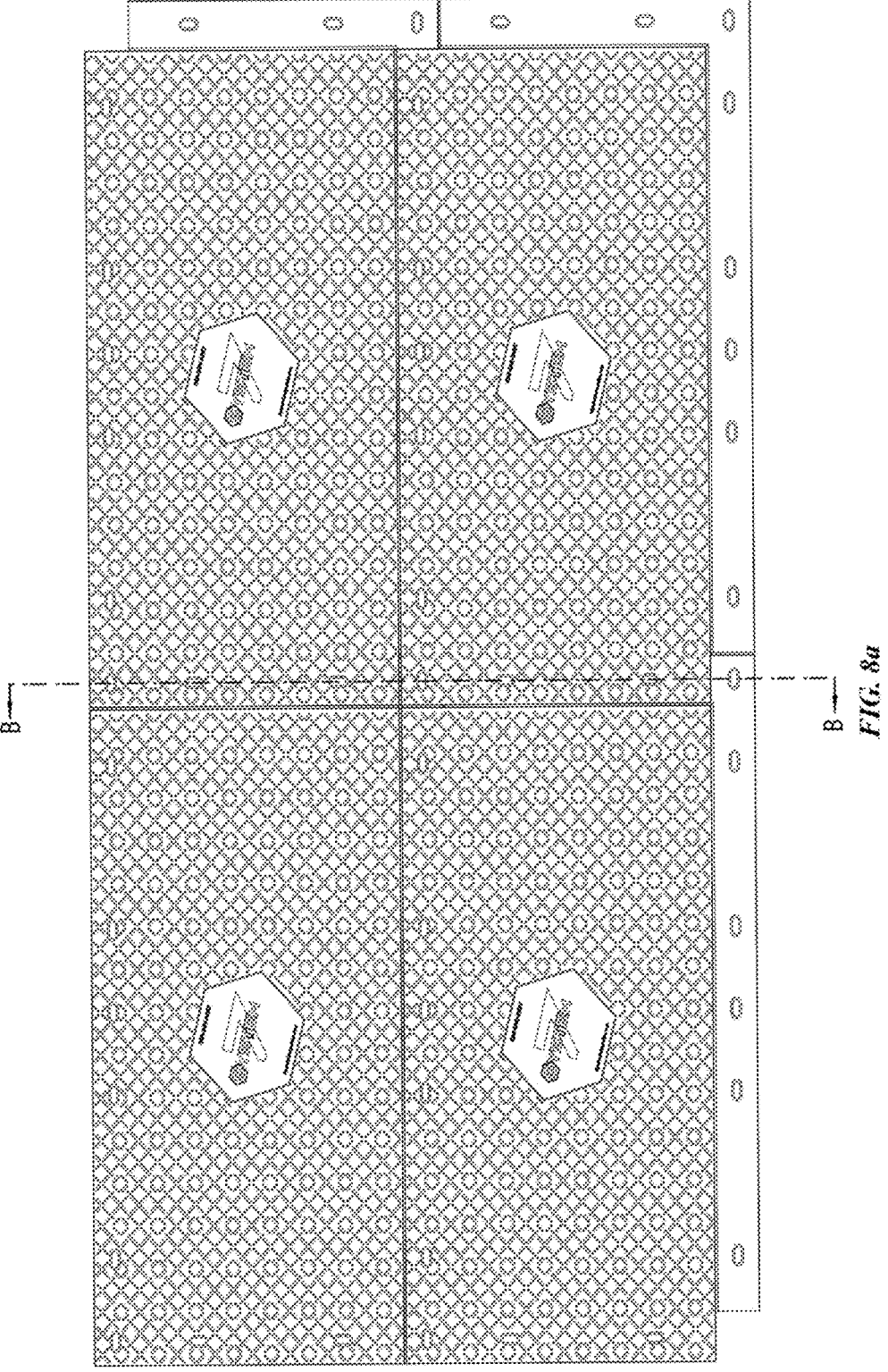
FIG. 8a is a top view of a modular mat system in accordance to one, or more embodiments.
Figure 8B:
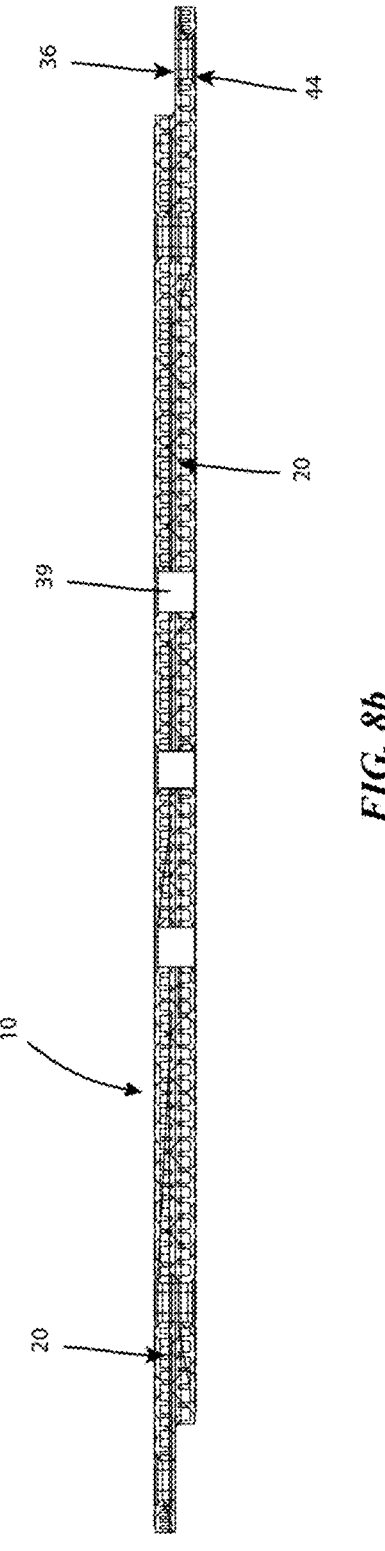
FIG. 8b is a cross-sectional view of FIG. 8a of a modular mat system in accordance to one, or more embodiments.

The second band 36 can be configured and positioned to provide an area for an adjacent modular mat 10 to overlap and join to the first modular mat as shown in FIG. 8 by the first band 44 wherein the first band guide holes 39 can substantially align with the guide holes of the second band. In other embodiments the second band 36 can be a solid piece of material and can substantially extend from the central core 16 at a constant thickness from its attachment point as shown in FIG. 2a. The second band can have a transition 40 to the central core 16 and exterior surface 28 wherein the transition can be, such as, a radius, a chamfer, a fillet, or the like. The transition 40 can be machined, welded, molded, or the like into the second band 36 and the central core 16, which adds strength and durability to the modular mat system 10 when in flexion or compression. In other embodiments, the second band 36 can extend along a substantial length of at least one side of the central core 16, it can extend along the length of every side of the central core or it can extend partially along the length of the central core. The second band 36 can comprise at least one guide hole 39 wherein the guide hole can be recessed into the exterior surface 28 of the second band and the first band 44 and can generally be rectangular in shape with radius ends, however, it may be any suitable shape, including square, triangular, or hexagonal. The guide holes 39 can be equal distance apart or placed such that the guides are positioned at varying distances. In certain embodiments, the guide holes 39 can be omitted from the first band 44 and the second band 36. The second layer 60, similarly has a second band 36 and a first band 44 with all its associated features.

Figure 9:
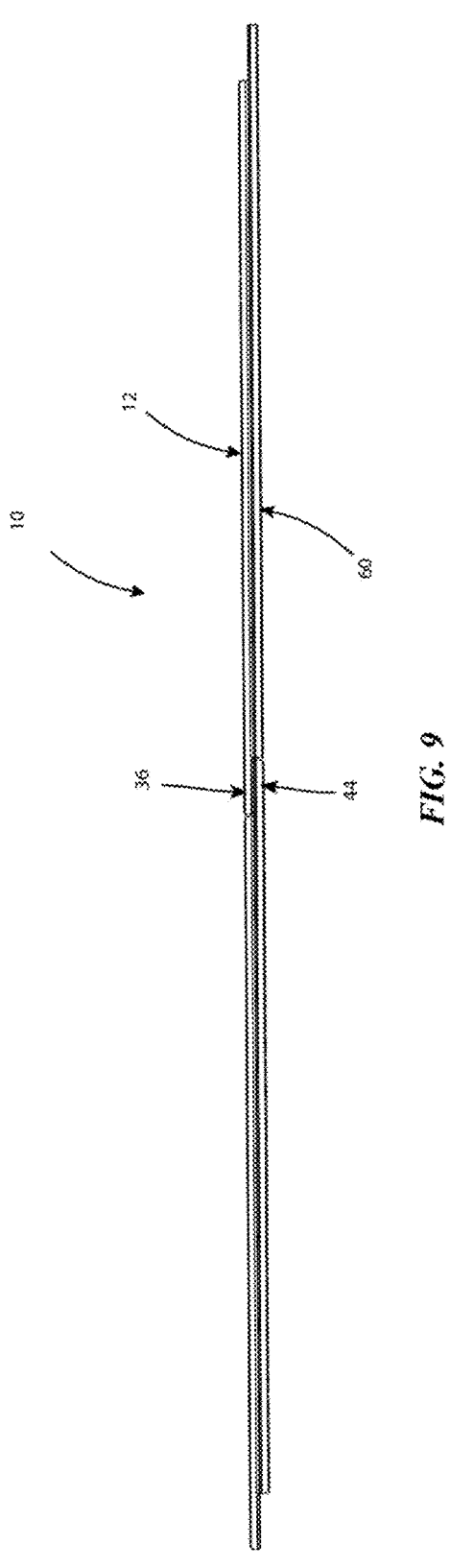
FIG. 9 is an exploded, side view showing the connection point of a modular mat system in accordance to one, or more embodiments.

In embodiments, the second band 36 can comprise a fourth cellular structure 37 and a fifth cellular structure 56 wherein the fourth cellular structure and fifth cellular structure can have similar properties to the second cellular structure 46 and third cellular structure 52 wherein the fourth cellular structure can be a finer mesh than the first cellular structure and the fifth cellular structure can be an even finer mesh than the fourth cellular structure, which adds strength to second band and the first band in both flexion and bending, and it can prevent possible pin tear out when the modular mat systems 10 are connected together with a pin (See FIG. 9). In addition, the finer cellular structure add strength to the first band and the second band allowing for larger vehicles to drive over the bands without deforming or warping the first band and the second band. The second band 36 and first band 44 are formed from the same material as the central core 16 such as, for example, high-density polyethylene (HDPE) plastic, polystyrene, polypropylene, acrylonitrile butadiene styrene, polyvinylchloride, or the like. The first cellular structure 20, secondary cellular structure 46, third cellular structure 52, fourth cellular structure 37 and the fifth cellular structure 56 can have a shape of a for example, but not limited to, triangle, square, rectangular, hexagonal, or the like.

9 | 10

A perimeter 58 can surround the outer most portion of the third cellular structure 52 and the fifth cellular structure 56. The perimeter 58 can encompass the first band 44 and the second band 36. The perimeter 58 as show in FIG. 4b can be congruent throughout its entirety, such that there are no overhangs or offset portions of the modular mat system 10 in which the first layer 12 and the second layer 60 are not matched or can be matched to the corresponding sections of the opposite layer.

The first layer 12 and the second layer 60 can be joined together to form one complete module mat system 10 by affixing the interior surfaces 18 together, including, but not limited to, fusion welding, hot welding or hand welding, seam welding and other methods appropriate for the materials comprising the first layer 12 and the second layer 60. Further, multiple methods of affixing the first layer 12 and the second layer 60 together can be utilized simultaneously such as, for example, the inner portions can be fusion welded and can be seamed welded together creating a seal around the modular mat system. The first layer 12 and the second layer 60 can be welded together wherein at least a portion of the cellular structures can be welded, but more preferably the entire inner portion of the cellular structures are welded together such that the first layer 12 and the second layer 60 can become one piece.

During the welding process the first layer 12 and the second layer 60 can be heated to a temperature sufficient to soften, but not melt, the material and the first layer and the second layer can be compressed together having each side overlap by for example, between 0.032 and 4 inches, more preferably between 0.1 inches and 2 inches and still more preferably a vertical offset of at least 0.125 inch. The first layer 12 and the second layer 60 can overlap by for example, between 0.032 and 4 inches, more preferably between 0.1 inches and 2 inches and still more preferably a vertical offset of at least 0.25 inch when compressed together. Any material extruded at the seam of the joined surfaces resulting from compression may be removed, such as by grinding, milling, routing, cutting, or the like once the surfaces have cooled. When the first layer 12 and the second layer 60 are affixed together to form the modular mat system 10, the guides holes 39 of the second band 36 and the first band 44 of the first layer and the second layer can line up with the corresponding guide holes of the opposing layers, as illustrated in FIG. 9. The guides holes 39 can have a channel on the exterior surface 28 and the second band 36 of the first layer 12 and the second layer 60 wherein the guide holes can extend to the interior surface 18 as a solid material.

As shown in FIG. 9 the second layer 60 can have all the features of the first layer 12. Referring to FIGS. 8-10, the modular mat system 10 when attached to another mat modular system, or a plurality of modular mat by adjoining, overlapping and interlocking the modular mat by a plurality of pins 70. The modular mat system 10 can be extendable in multiple directions to accommodate the topographic area it will be placed on. The topographic area that the modular mat system 10 is directed at conforming to can be adapted to different topographic or geographic features of the surface of the ground such as grass, dirt, rocks, or the like, wherein when the modular mat system are connected together the vehicle's weight can be distributed equally over a larger surface area and can operate as one complete mat wherein the pin 70 can connect the modular mats systems together creating a larger modular mat system 100 with multiple mats, which allows the user to create a customized ground cover for heavy industrial equipment to drive over, or be placed on.

It is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

We claim:

1. A module mat system comprising:
   a first layer and a second layer, each layer having an interior surface and an exterior surface,
   the interior surface comprising a central core with a first cellular structure formed from core ribs extending from the interior surface wherein the cells of the first cellular structure have a first rib pattern;
   a first band extending from at least one side of the central core, wherein the first band has a second cellular structure formed from first band ribs extending from the interior surface of the first band, wherein the cells of the second cellular structure have a second rib pattern;
   wherein each core rib that abuts the first band has a corresponding first band rib that aligns with the core rib; and
   the second rib pattern is smaller than the first rib pattern such that the cell density of the second rib pattern is more dense than the cell density of the first rib pattern.

2. The module mat system of claim 1, wherein the first band has a first portion that is proximal to the central core and a second portion distal to the central core, wherein the second portion has a third cellular structure formed from ribs extending from the interior surface of the first band, wherein the third cellular structure has a third rib pattern and the third rib pattern is smaller than the second rib pattern such that the cell density of the third rib pattern is more dense than the cell density of the second rib pattern.

3. The module mat system of claim 1, wherein the first band includes at least one guide hole in the first band.

4. The modular mat system of claim 2, further comprising a guide hole in the first portion of the first band.

5. The module mat system of claim 1, wherein the exterior surface of at least one layer comprises a plurality of traction elements raised from the exterior surface.

6. The module mat system of claim 2, comprising a second band extending peripherally from at least one side of the central core, wherein the second band is vertically offset from the first band.

7. The module mat system of claim 6, wherein the second band connects to the central core at a peripheral wall, and wherein the peripheral wall is taller than the cell ribs that contact the peripheral wall.

8. The module mat system of claim 7, wherein the cell ribs have a height, and wherein the height of the second band ribs is lower than the height of the core ribs.

9. The module mat system of claim 1, wherein the first layer and the second layer are welded together.

10. The module mat system of claim 1, wherein the cell ribs of the first layer are welded to the cell ribs of the second layer.

11. The module mat system of claim 6, wherein the first band of the first layer is welded to the second band of the second layer.

12. The module mat system of claim 7, wherein the second band has a third portion that is proximal to the central core and a fourth portion distal to the central core, wherein the third portion has the fourth cellular structure with the fourth rib pattern and whrein the fourth portion has a fifth cellular structure formed from ribs extending from the interior surface of the second band forming a fifth rib pattern, wherein the fifth rib pattern is smaller than the fourth rib pattern such that the cell density of the fifth rib pattern is more dense than the cell density of the fourth rib pattern.

13. The module mat system of claim 12, wherein the second and the fourth rib patterns are the same and wherein the third and the fifth rib patterns are the same.

* * * * *